United States Patent

Tsuji

[11] Patent Number: 6,009,316
[45] Date of Patent: Dec. 28, 1999

[54] RECEIVER WITH AN ANTENNA SWITCH, IN WHICH SENSITIVITY AND QUALITY OF RECEPTION IS IMPROVED

[75] Inventor: Kazushi Tsuji, Tokyo, Japan

[73] Assignee: NEC Corporation, Tokyo, Japan

[21] Appl. No.: 08/880,766

[22] Filed: Jun. 23, 1997

[30] Foreign Application Priority Data

Jun. 21, 1996 [JP] Japan .................................. 8-161716

[51] Int. Cl.⁶ ...................................................... H04Q 7/32
[52] U.S. Cl. ................................... 455/277.1; 455/277.2; 455/283; 455/83
[58] Field of Search .......................... 455/283, 83, 227.1, 455/277.2

[56] References Cited

FOREIGN PATENT DOCUMENTS

| 0 594 434 A2 | 4/1994 | European Pat. Off. . |
| 0 673 112 A1 | 9/1995 | European Pat. Off. . |
| 5-34737 | 5/1993 | Japan . |
| 6-140959 | 5/1994 | Japan . |
| 6-252794 | 9/1994 | Japan . |
| 7-297752 | 11/1995 | Japan . |

*Primary Examiner*—Dwayne D. Bost
*Assistant Examiner*—Alan T. Gantt
*Attorney, Agent, or Firm*—Foley & Lardner

[57] ABSTRACT

In a receiver having an antenna switch (23) which is connected between a receiving section (24) and an antenna (21) for adjusting a received signal so that the received signal has, as a current signal level, one of a first and a second signal level, a switch control section (26) controls an operation of the antenna switch by the use of a current signal level of the received signal and a first and a second reference level which are determined in first and second determining sections (27, 28), respectively. In order to detect the current signal level, a signal level detection circuit (25) is connected to the antenna switch. It is preferable that a signal level holding circuit (34) is connected between the signal level detection circuit and the switch control section and is for holding the current signal level during a predetermined time duration.

21 Claims, 6 Drawing Sheets

RECEIVER WITH AN ANTENNA SWITCH, IN WHICH SENSITIVITY AND QUALITY OF RECEPTION IS IMPROVED

BACKGROUND OF THE INVENTION

This invention relates to a receiver with an antenna switch known in the art. The receiver of the type is suitable for use in a mobile communication apparatus.

Such a conventional receiver is disclosed as a radio apparatus in, for example, Japanese Unexamined Utility Model Publication No. 34737/1993. The conventional receiver has been used in a TDD radio apparatus in order to implement the apparatus in a small size and at a low cost and to avoid deterioration in sensitivity upon reception of a high electric field.

However, the conventional receiver has a problem in which reception sensitivity is deteriorated by a switching operation of the antenna switch when the high electric field is supplied. The reason is as follows. In controlling the antenna switch, a same value is used as a reference level in common, both in switching from on to off, and in switching from off to on. Therefore, if the antenna switch is switched when the reception electric field level is not smaller than the reference level, the reception electric field level immediately becomes lower than the reference level. In this event, the switching condition of the antenna switch can not be maintained so that the high electric field is intermittently supplied to the receiving section. As a result, it is impossible to obtain a stable reception signal.

SUMMARY OF THE INVENTION

It is therefore an object of the present invention to provide a receiver with an antenna switch, in which sensitivity and quality of reception is improved.

It is another object of this invention to provide a receiver of the type, in which reception can be carried out without deterioration in sensitivity even when a reception electric field is high.

Other objects of this invention will become clear as the description proceeds.

According to an aspect of this invention, there is provided a receiver which comprises a receiving section for receiving a received signal through an antenna, an antenna switch between the receiving section and the antenna for adjusting the received signal so that the received signal has, as a current signal level, one of a first and a second signal level, and control means for controlling an operation of the antenna switch. In the receiver, the control means comprises a detection circuit connected to the antenna switch for detecting the current signal level, a first determining section for determining a first reference level, a second determining section for determining a second reference level lower than the first reference level, and a switch control section connected to the antenna switch, the detection circuit, and the first and the second determining sections for controlling the operation of the antenna switch by the use of the current signal level and the first and the second reference levels.

According to another aspect of this invention, there is provided a receiver with an antenna switch which in operable to disconnect, when a reception electric field is high, an antenna and a receiving section to reduce the reception electric field. The receiver is characterized in that the antenna switch has different reference values in a switching operation when the antenna and the receiving section are disconnected from one another and when the antenna and the receiving section are connected to each other.

According to still another object of this invention, there is provided a receiver which comprises an antenna, a receiving section for receiving an electric wave through the antenna, an antenna switch interposed between the antenna and the receiving section for switching the connection between the antenna and the receiving section, a switch control section for controlling the antenna switch, and a detection circuit for producing a reception intensity signal corresponding to a reception field intensity to deliver the reception intensity signal to the switch control section. The antenna switch control section compares the reception intensity signal with a predetermined reference value to control the antenna switch. The receiver is characterized in that first and second reference levels are determined as the predetermined reference level and that the switch control section comprises a first comparing means for comparing, when the antenna and the receiving section are connected, the reception intensity signal with the first reference value to controllably open the antenna switch, and a second comparing means for comparing when the antenna and the receiving section are disconnected, the reception intensity signal with the second reference value to controllably close the antenna switch.

DESCRIPTION OF THE PREFERRED EMBODIMENTS

Figure 1:
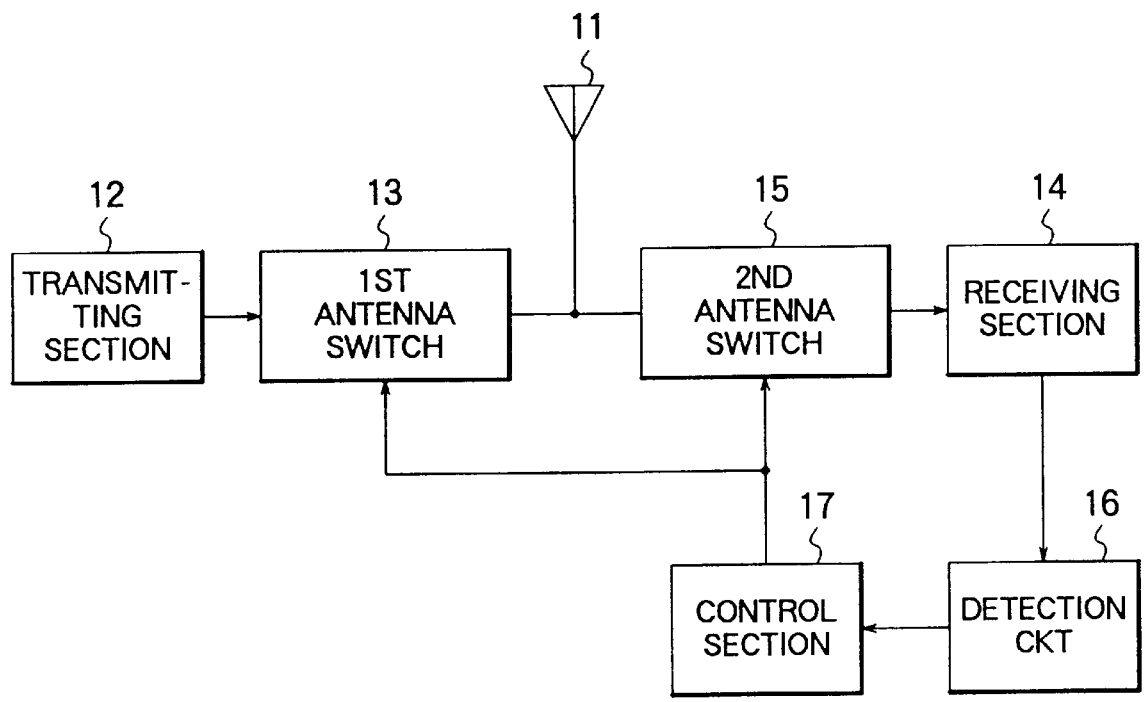
FIG. 1 is a block diagram of a radio apparatus including a conventional receiver with an antenna switch.

For a better understanding of this invention, description will at first be made with regards to a radio apparatus including a conventional receiver with an antenna switch with reference to the drawing.

Referring to FIG. 1, the radio apparatus is similar to the radio apparatus of a preamble part and has a transmitting function and a receiving function.

The radio apparatus of FIG. 1 comprises an antenna 11, a transmitting section 12, a first antenna switch 13, a receiving section 14, a second antenna switch 15, a detection circuit 16, and a control section 17. The transmitting section 12 is for transmitting a transmitting signal through the antenna 11. The first antenna switch 13 is connected between the antenna 11 and the transmitting section 12 and is for adjusting the transmitting signal in the manner known in the art. The receiving section 14 is for receiving a received signal through the antenna 11. The second antenna switch 15 is connected between the antenna 11 and the receiving section 14 and is for adjusting the received signal so that the received signal has, as a current signal level, one of a first signal level and a second signal level that is lower than the first signal level. The detection circuit 16 is connected to the receiving section 14 and is for detecting the current signal level to produce a detection signal representative of a reception electric field level surrounding the antenna 11. The control section 17 is connected to the detection circuit 16 and the first and the second antenna switches 13 and 15 and is for controlling operations of the first and the second antenna switches 13 and 15 in response to the detection signal to make the first and the second antenna switches 13 and 15 be turned on and off, respectively, when transmission is carried out. On the other hand, upon reception, the first and the second antenna switches 13 and 15 are turned off and on, respectively, when the reception electric field level is not greater than a reference level determined in the control section 17. When the reception electric field level is not smaller than the reference level, the second antenna switch 15 is turned oft even if the reception is being carried out. The reception electric field level is attenuated at the second antenna switch 15 and supplied to the receiving section 14.

Next, the description will be directed to a radio apparatus including a receiver according to a first embodiment of the present invention with reference to the drawing.

Figure 2:
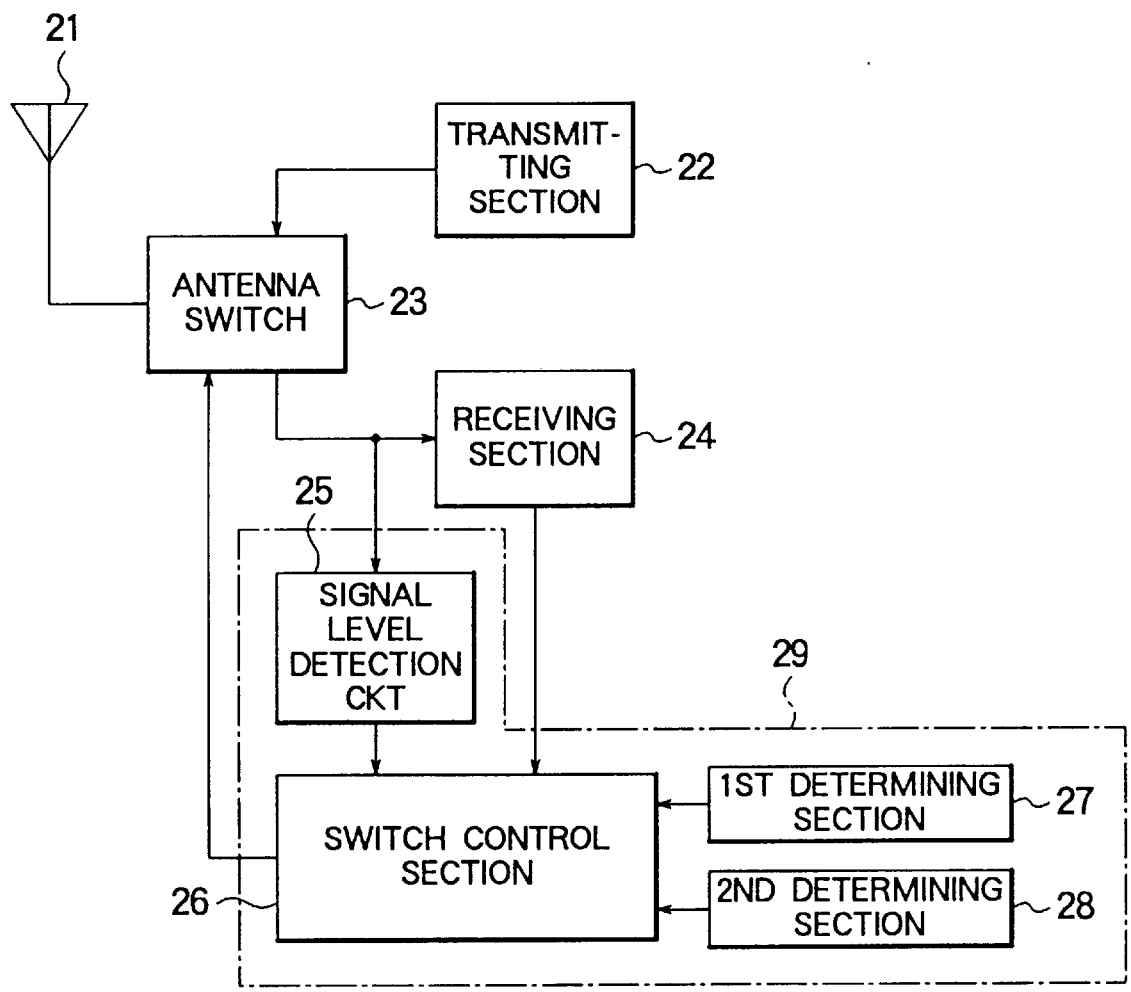
FIG. 2 is a block diagram of a radio apparatus including a receiver according to a first embodiment of the present invention.

Referring to FIG. 2, the radio apparatus has the transmitting and the receiving functions and comprises an antenna 21, a transmitting section 22, an antenna switch 23, a receiving section 24, a signal level detection circuit 25, a switch control section 26, a first determining section 27, and a second determining section 28.

The transmitting section 22 is for transmitting the transmitting signal through the antenna 21. The receiving section 24 is for receiving the received signal through the antenna 21 in the manner known in the art and is for producing a reception timing signal which will later become clear. In other words, the receiving section 24 is supplied with the received signal, namely, an output signal of the antenna switch 21 and produces the reception timing signal.

The antenna switch 23 is a high frequency switch and is connected between the antenna 11 and each of the transmitting and the receiving sections 22 and 24. Responsive to a switch control signal which will later be described, the antenna switch 23 switches the connection between the antenna 21 and either the transmitting and the receiving sections 22 and 24. When the transmitter 22 transmits the transmitting signal, the antenna switch 23 adjusts the transmitting signal in the manner known in the art. When the receiver 24 receives the received signal, the antenna switch 23 adjusts the received signal so that the received signal has, as the current signal level, one of the first and the second signal levels.

The signal level detection circuit 25 is connected to the antenna switch 23 and is for detecting the current signal level in response to the received signal. In other words, the signal level detection circuit 25 is supplied with the received signal, namely, the output signal of the antenna switch 23 and produces a current level signal representative of the current signal level or the reception electric field level.

The first determining section 27 is for determining a first reference level. The second determining section 28 is for determining a second reference level.

The switch control section 26 is connected to the antenna switch 23, the receiving section 24, the signal level detection circuit 25, and the first and the second determining sections 27 and 28 and is for producing the above-mentioned switch control signal by the use of the current signal level and the first and the second reference levels in the manner which will become clear from the following description. A combination of the signal level detection circuit 25, the switch control section 26, and the first and the second determining sections 27 and 28 is referred to as a control arrangement 29.

It will be assumed that the antenna switch 23 is connected to the side of the receiving section 24. In this state, the received signal has the first signal level. Upon reception of a high reception electric field signal such that the linearity of the radio apparatus can not be maintained, the switch control section 26 produces the switch control signal. The antenna switch 23 is switched to the side of the transmitting section 22 in response to the switch control signal. As a result, the received signal is attenuated from the first signal level to the second signal level.

The first reference level is used in a case where the antenna switch 23 is switched from the side of the receiving section 24 to the side of the transmitting section 22. The second reference level is used at a time when the antenna switch 23 is switched from the side of the transmitting section 23 to the side of the receiving section 24.

Figure 3:
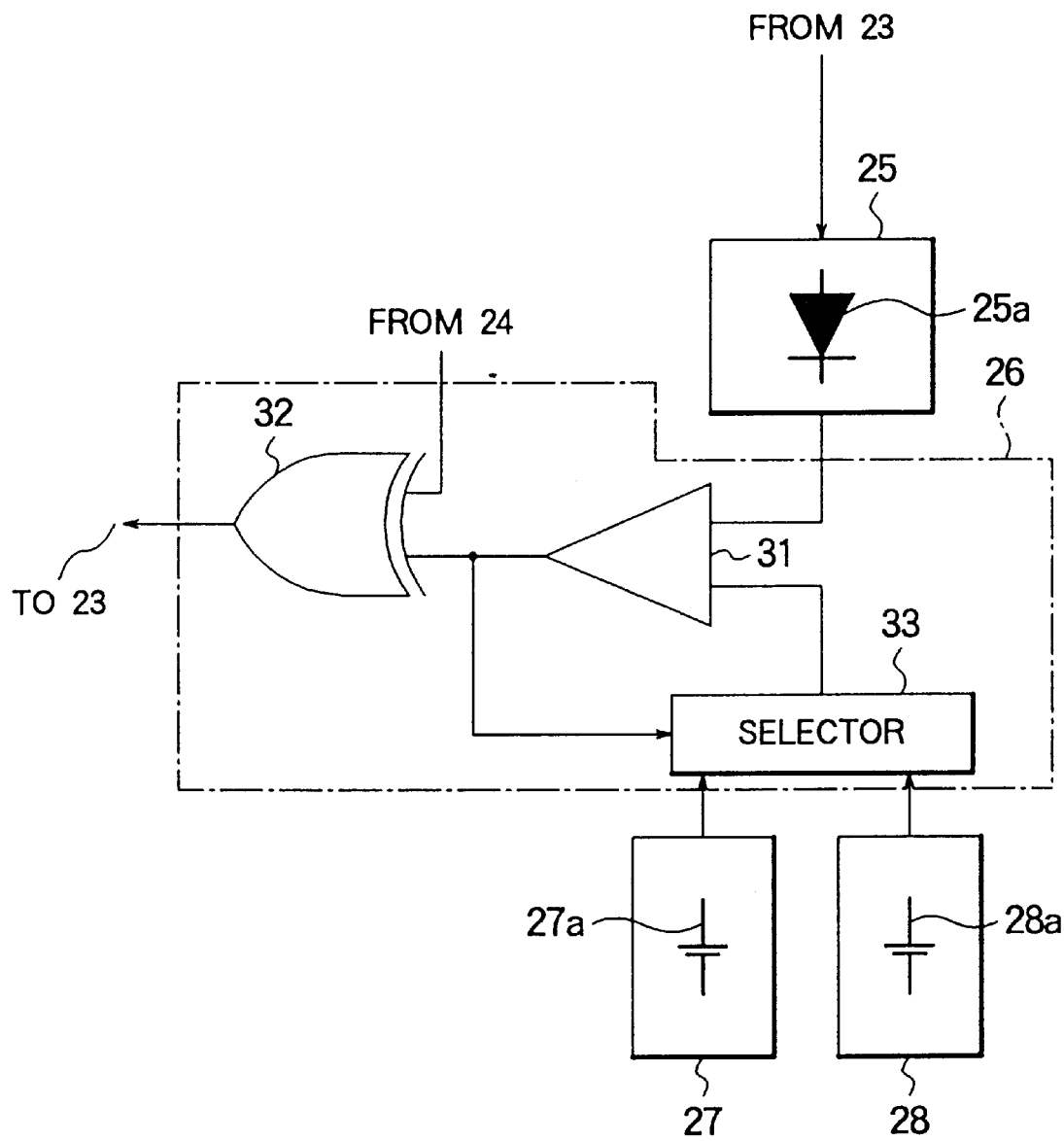
FIG. 3 is a block diagram of a control arrangement included in the radio apparatus of FIG. 2.

Turning to FIG. 3, the description will be directed to the control arrangement 29. In the manner known in the art, the control arrangement 29 can be implemented by a diode, a constant-voltage element, a comparator, and a logical operation circuit.

In the manner which will presently be described, the switch control section 26 comprises a comparator 31, a logical circuit 32, a selector 33.

The selector 33 is connected to the first and the second determining sections 27 and 28 and is for selecting, as a selected reference level, one of the first and the second reference levels in accordance with a selection signal which will later become clear. In other words, the selector 33 is supplied with the selection signal, namely, an output of the comparator 31 as a trigger and is for selecting the first reference level and the second reference level when the antenna switch 23 selects the reception side and when the antenna switch 23 selects the transmission side, respectively.

The comparator 31 is connected to the signal level detection circuit 25 and the selector 33 and is for comparing the current signal level with the selected reference level to produce a comparison result signal. The comparison result signal is supplied as the selection signal to the selector 33.

Mare particularly, the comparator 31 has a structure such that the first reference level and the current signal level are compared to each other when the antenna switch 23 selects the reception side. In other words, the comparator 31 compares the current signal level with the first reference level to produce a first control signal as the comparison result signal when the current signal level is higher than the first reference level. In this event, the comparator 31 will be referred to as a first comparing arrangement. The comparator 31 further has a structure such that the second reference level and the current signal level are compared to each other when the antenna switch 23 selects the transmission side. In other words, the comparator 31 compares the current signal level with the second reference level to produce a second control signal as the comparison result signal when the current signal level is lower than the second reference level. In this event, the comparator 31 will be referred ta as a second comparing arrangement.

The logical circuit 32 is connected to the receiving section 24, the comparator 31 and the antenna switch 23 and is for carrying out an exclusive logical operation in response to the reception timing signal and the comparison result signal to produce the switch control signal that is supplied to the antenna switch 23. More particularly, the logical circuit 32 makes the antenna switch 23 enforce the received signal into the second signal level in response to the first control signal and makes the antenna switch 23 enforce the received signal into the first signal level in response to the second control signal. In these events, the logical circuit 32 will be referred to as a first and a second making arrangement.

The signal level detection circuit 25 may comprise a semiconductor detector 25a which carries out an envelop detection of a received high frequency signal in the manner known in the art.

The first and the second determining sections 27 and 28 may comprise first and second constant-voltage elements. 27a and 28a, respectively. The first constant-voltage element 27a is given a predetermined voltage corresponding to a particular reception electric field level over which the linearity of the receiver cannot be maintained when the antenna switch 23 selects the reception side. The second constant-voltage element 28a is given a preselected voltage corresponding to a specific reception electric field level such that a sufficient linearity is assured even if the antenna switch 23 is switched to the reception side while the antenna switch 23 selects the transmission side.

Each of the first and the second reference levels may be digitally stored by the use of a semiconductor memory known in the art. In this case, the comparator 33 digitally compares the current signal level with each of the first and the second reference levels.

Figure 4:
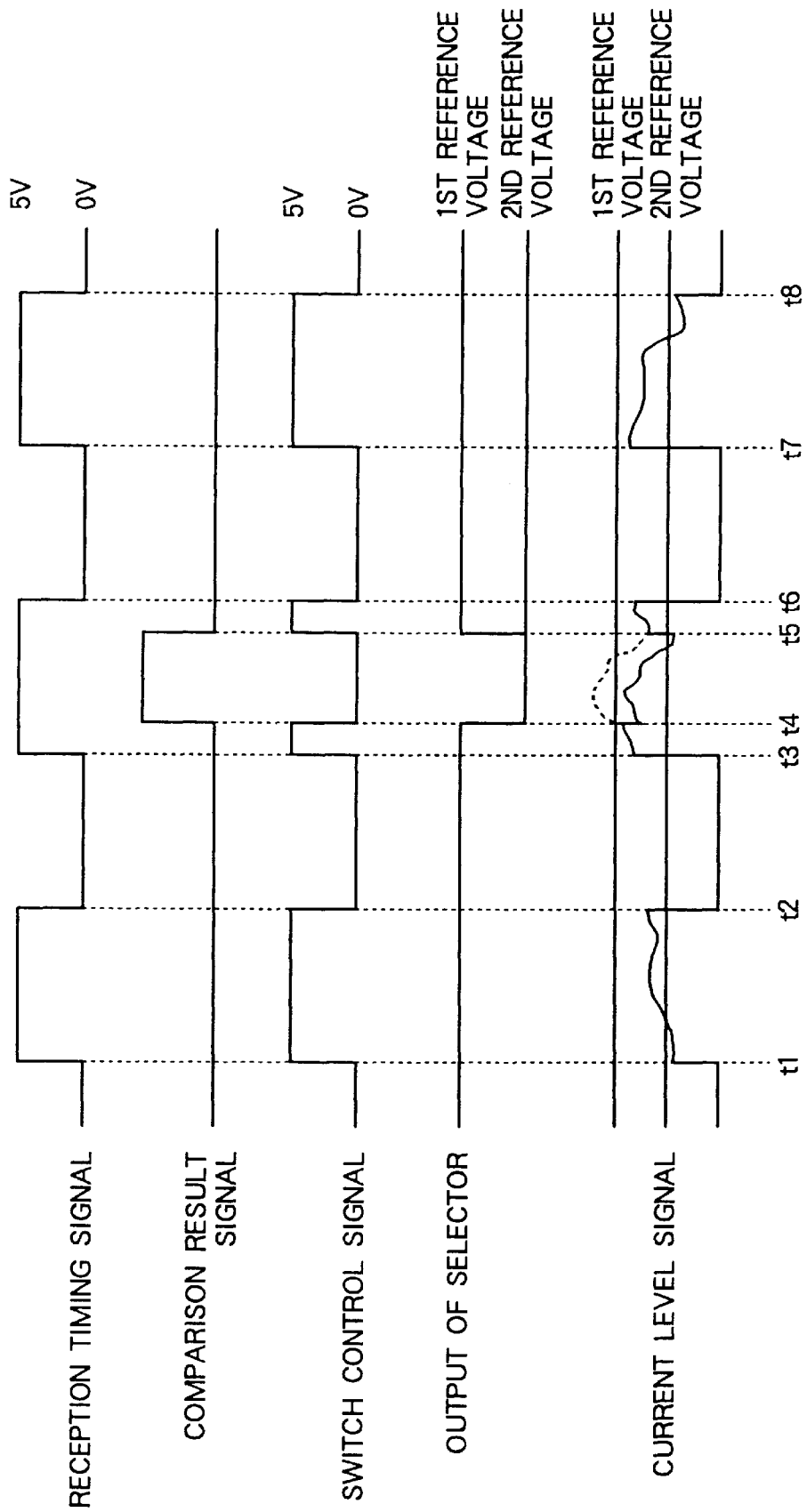
FIG. 4 is a time chart for describing an operation of the radio apparatus illustrated in FIG. 2.

Referring to FIG. 4 together with FIGS. 2 and 3, the description will be made about operation of the radio apparatus. The antenna switch 23 is switched to the reception side and the transmission side when the switch control signal has 5V and 0V, respectively. By way of example, the description will now be made about a digital transceiver for repeating transmission and reception at a predetermined interval. In this connection, it will be assumed that a reception in carried out between first and second time instants t1 and t2, between third and sixth time instants t3 and t6, and between seventh and eighth time instants t7 and t8, while transmission is carried out between the second and the third time instants t2 and t3 and between the sixth and the seventh time instants t6 and t7.

The reception timing signal has 5V and 0V upon reception and transmission, respectively. The switch control signal is coincident with the reception timing signal between the first and the third time instants t1 and t3 as a result of an exclusive OR operation between the reception timing signal and the comparison result signal. The current level signal is variable in response to a condition of the receiver. A dashed-line portion of the current level signal represents a case where control of the present invention is not carried out. At the third time instant t3 when the reception is started, the comparator 31 compares the current level signal with a first reference voltage representative of the first reference level. In the meanwhile, at the fourth time instant t4 when the current level signal exceeds the first reference voltage, the comparison result signal is reversed. As a result, the switch control signal becomes equal to 0V. The antenna switch 23 is switched to the side of the transmitting section 22 to reduce the current level signal. In response to the comparison result signal reversed at the fourth time instant t4, a second reference voltage representative of the second reference level is selected as an output of the selector 33. The comparator 31 starts a comparison between the second reference voltage and the current level signal. On the other hand, at the fifth time instant t5 when the antenna switch 23 selects the transmitting section 22 and the current level signal becomes smaller than the second reference value, the comparison result signal is reversed again. As a result, the switch control signal becomes equal to 5V. The antenna switch 23 is again switched to the side of the receiving section 24 to increase the current signal level. Furthermore at the fifth time instant t5, the first reference voltage is selected as the output of the selector 33. The comparator 31 starts again comparison between the first reference voltage and the current level signal.

When the reception electric field is high, the reception electric field is reduced by disconnecting the antenna and the receiving section by the use of the antenna switch. Upon switching of the antenna switch, the different reference values are used in switching from a reception side to a transmission side and in switching from the transmission side to the reception side, respectively. Accordingly, when the reception electric field is high, the reception signal supplied to the receiving section is controlled within a range such that the linearity of the receiver is continuously maintained. As a result, it is possible to avoid occurrence of deterioration in sensitivity when the reception electric field is high.

Figure 5:
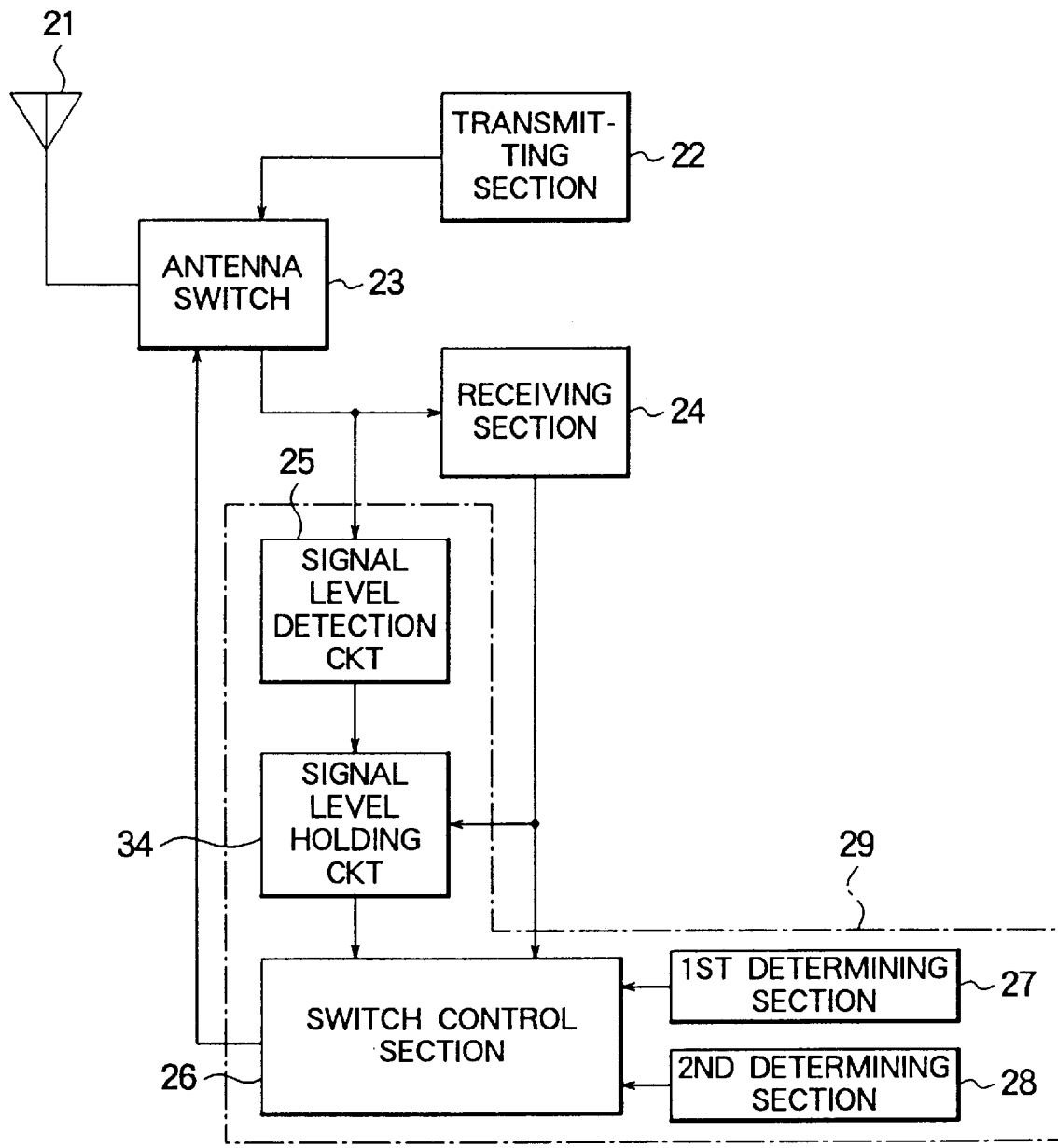
FIG. 5 is a block diagram of a radio apparatus including a receiver according to a second embodiment of the present invention.

Turning to FIG. 5, the description will be directed to a radio apparatus including a receiver according to a second embodiment of the present invention. The radio apparatus comprises similar parts designated by like reference numerals.

In the radio apparatus of FIG. 5, the control arrangement 29 further comprises a signal level holding circuit 34 which is connected to the receiving section 24 and between the signal level detection circuits 25 and the switch control section 26 and is for holding the current signal level during a predetermined time duration. The signal level holding circuit 34 is supplied with the current level signal and the reception timing signal. The switch control section 26 is supplied with the first reference level, the second reference level, and an output of the signal level holding circuit 34 and produces the switch control signal that is supplied to the antenna switch 23.

Figure 6:
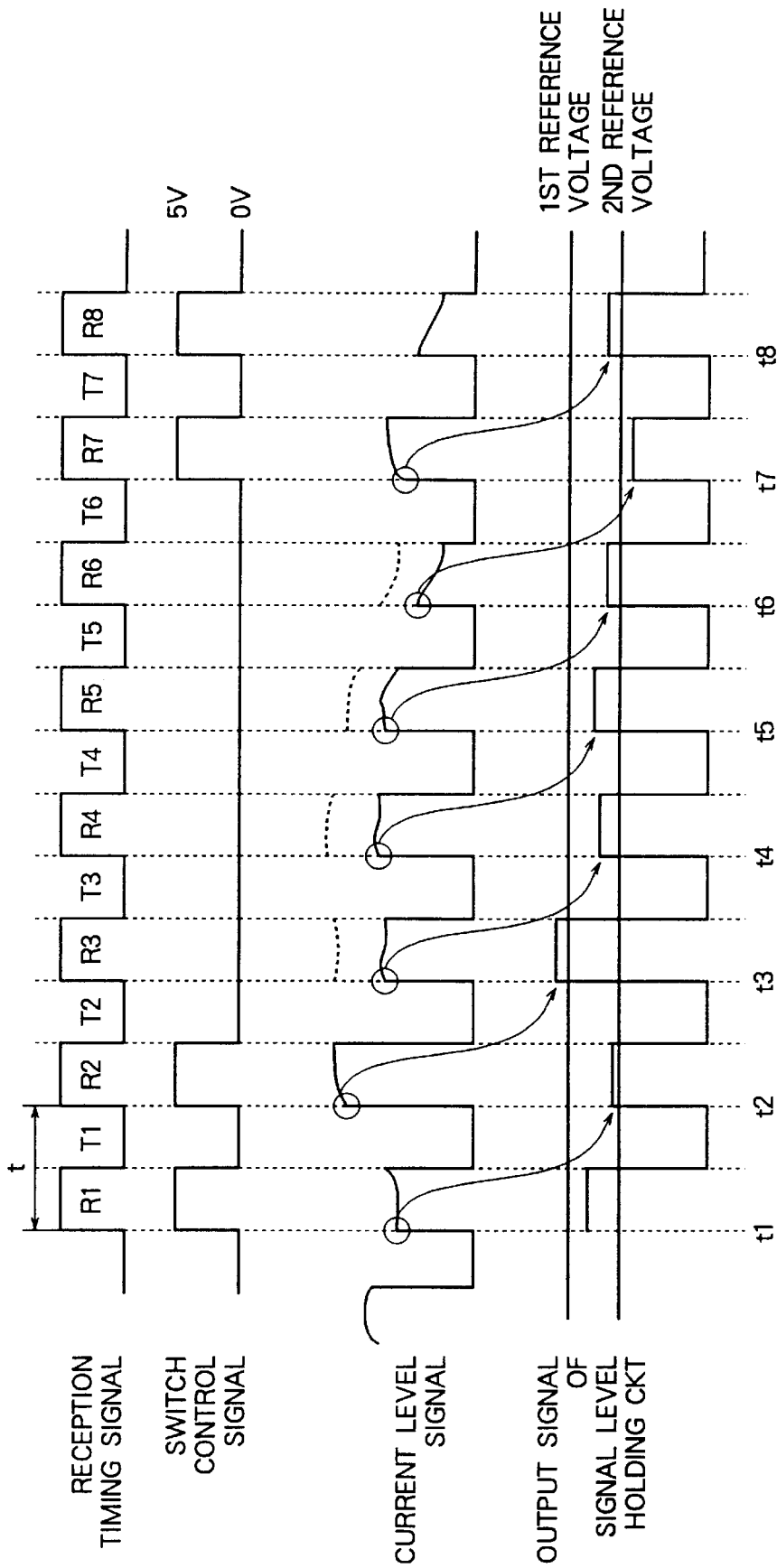
FIG. 6 is a time chart for describing an operation of the radio apparatus illustrated in FIG. 5.

Referring to FIG. 6, the description will be made as regards an operation of the radio apparatus of FIG. 5. In FIG. 6, the reception is carried out during each of time durations R1 through R8 while the transmission is carried out during each of time durations T1 through T7. The signal level holding circuit 34 is supplied with the reception timing signal and the current level signal and carries out sampling of the current level signal at a reception start timing t1 for delivery at a next reception start timing t2 after lapse of the predetermined time duration. A dashed-line portion of the current level signal represents a case where the control of the present invention is not carried out. Similar operation is carried out at each of reception start timing t2 to t8. The switch control section 26 compares an output signal of the signal level holding circuit 34 with the first reference voltage. When the output signal of the signal level holding circuit 34 exceeds the first reference voltage at the timing t3, the switch control signal becomes equal to 0V. Even during the reception, the antenna switch 23 is switched to the transmission side to reduce the current signal level of the received signal. At the same time, the antenna switch control section 23 starts comparison between the output signal of the signal level holding circuit 34 and the second reference voltage. When the output signal of the signal level holding circuit 34 becomes smaller than the second reference voltage at the timing t7, the switch control signal becomes equal to 5V. The antenna switch 23 is switched to the reception side during the reception to increase the current signal level of the received signal. At the timing t7, the antenna switch control section 23 again starts comparison between the output signal of the signal level holding circuit and the first reference voltage.

In the radio apparatus, comparison is made between each of the first and the second reference levels and the current signal level which is held upon the latest reception. Therefore, no switching of the antenna switch 23 is caused to occur within the reception timing. Thus, when reception is made of a signal, such as a digital demodulation signal for use in mobile communication, which contains information in an amplitude thereof, it is possible to avoid deterioration in sensitivity as a result of switching the antenna switch 23.

While the present invention has thus far been described in connection with a few embodiments thereof, it will readily be possible for those skilled in the art to put this invention into practice in various other manners. For example, The structure of the present invention is also applicable to a radio apparatus for exclusively carrying out reception.

What is claimed is:

1. A receiver comprising a receiving section for receiving a received signal through an antenna, an antenna switch between said receiving section and said antenna for adjusting said received signal so that said received signal has, as a current signal level, one of a first and a second signal level, and a control device for controlling an operation of said antenna switch, wherein said control device comprises:
    a detection circuit connected to said antenna switch for detecting said current signal level;
    a first determining section for determining a first reference level;
    a second determining section for determining a second reference level that is lower than said first reference level;
    said receiving section generating a reception timing signal;
    a switch control section, connected to said antenna switch, said detection circuit, and said first and said second determining sections, wherein said switch control section controls said operation of said antenna switch by the use of said current signal level and said first and said second reference levels;
    wherein said switch control section comprises:
        a comparing device connected to said detection circuit and said first determining section, for comparing said current signal level with said first reference level to produce a first control signal when said current signal level is higher than said first reference level;
        said comparing device, connected to said second determining section, for comparing said current signal level with said second reference level to produce a second control signal when said current signal level is lower than said second reference level;
        a logic device connected to said comparing device and said antenna switch for controlling the adjusting of said received signal to said second signal level in response to said first control signal;
        said logic device further connected to said comparing device for controlling the adjusting of said received signal to said first signal level in response to said second control signal; and
        said logic device receiving said reception timing signal for switching said antenna switch at reception timing intervals.

2. A receiver as recited in claim 1, wherein said receiver is a radio apparatus for exclusively carrying out reception.

3. A receiver as claimed in claim 2, wherein said antenna switch adjusts said received signal in response to a switch control signal, wherein said detection circuit produces a current level signal representative of said current signal level, said switch control section comprising:
    a selector connected to said first and said second determining sections for selecting, as a selected reference level, one of said first and said second reference levels in accordance with a selection signal;
    a comparator connected to said detection circuit and said selector for comparing said current signal level with said selected reference level to produce a comparison result signal, said comparison result signal being supplied as said selection signal to said selector; and
    a logical circuit connected to said receiving section, said comparator, and said antenna switch for carrying out an exclusive logical operation in response to said current level signal and said comparison result signal to produce said switch control signal that is supplied to said antenna switch.

4. A receiver as claimed in claim 2, wherein said switch control section comprises a signal level holding circuit connected to said detection circuit and said switch control section for holding said current signal level during a predetermined time duration.

5. A receiver as claimed in claim 1, wherein said first and said second reference levels are determined by a first an second constant-voltage elements, respectively.

6. A receiver as claimed in claim 1, further comprising a signal level holding circuit that is interposed between said detection circuit and said switch control section, said signal level holding circuit delivering said first and a second signal levels of said current signal level to said switch control circuit when a next reception is carried out.

7. A receiver comprising:
    an antenna,
    a receiving section generating a reception timing signal;
    an antenna switch operable in a disconnect state, when a reception electric field is high, said disconnect state operating to reduce said reception electric field, said antenna switch having different reference values when said antenna and said receiving section are disconnected from one another in said disconnect state and when said antenna and said receiving section are connected to each other in a connect state,
    a detection circuit connected to said antenna switch for detecting a first and second value of said reception electric field;
    a first determining section for determining a first reference value;
    a second determining section for determining a second reference value that is lower than said first reference value;
    a switch control section, connected to said antenna switch, said detection circuit, and said first and said second determining sections, wherein said switch control section controls said operation of said antenna switch, when said reception electric field is larger than a predetermined high value, and by the use of said first and said second reference values;
    wherein said switch control section comprises:
        a comparing device connected to said detection circuit and said first determining section, for comparing said first value of said reception electric field with said first reference value to produce a first control signal when said first value of said reception electric field is larger than said first reference value;
        said comparing device, connected to said second determining section, for comparing said second value of said reception electric field with said second reference value to produce a second control signal when said second value of said reception electric field is lower than said second reference value;

a logic device, connected to said comparing device and said antenna switch, for controlling the adjusting of said first value of said reception electric field to said second value of said reception electric field, in response to said first control signal;

said logic device further connected to said comparing device for controlling the adjusting of said second value of said reception electric field to said first value of said reception electric field, in response to said second control signal; and said logic device receiving said reception timing signal for switching said antenna switch at reception timing intervals.

8. A receiver as recited in claim 7, wherein said first and said second reference values are determined by a first and second constant-voltage elements, respectively.

9. A receiver as recited in claim 7, wherein said first and said second reference values are determined by a first and second diode, respectively.

10. A receiver as recited in claim 7, wherein each of said first and said second reference values are determined by a comparator.

11. A receiver as recited in claim 7, wherein each of said first and said second reference values are determined by a logical operation circuit.

12. A receiver as recited in claim 7, wherein said receiver is a radio apparatus for exclusively carrying out reception.

13. A receiver as recited in claim 7, further comprising a signal level holding circuit that is connected between said detection circuit and said switch control section, said signal level holding circuit delivering said first and second values of said reception electric field to said switch control section when a next reception is carried out.

14. A receiver as recited in claim 7, further comprising a selector, wherein said selector is utilized for selection of said first and second reference levels, and an output of said comparator, wherein said output of said comparator controls said selector.

15. A receiver comprising:

an antenna, a receiving section for receiving an electric wave through said antenna, wherein
said receiving section generates a reception timing signal;

an antenna switch interposed between said antenna and said receiving section for switching the connection between said antenna and said receiving section, a switch control circuit for controlling said antenna switch, and a detection circuit, for producing a reception intensity signal corresponding to a reception field intensity, and to deliver said reception intensity signal to said switch control circuit, wherein
said antenna switch control circuit comparing said reception intensity signal with a predetermined reference value to control said antenna switch, wherein first and second reference levels are determined as said predetermined reference level, and wherein said switch control circuit comprises:

a first comparing device, when said antenna and said receiving section are connected, for comparing said reception intensity signal with said first reference value to controllably open said antenna switch by generating a first control signal;

a second comparing device, when said antenna and said receiving section are disconnected, for comparing said reception intensity signal with said second reference value to controllably close said antenna switch by generating a second control signal;

a logic device connected to said comparing device and said antenna switch for controlling the adjusting of said reception intensity signal to a second reception intensity signal level in response to said first control signal;

said logic device further connected to said comparing device for controlling the adjusting of said reception intensity signal to a first reception intensity signal level in response to said second control signal; and said logic device receiving said reception timing signal for switching said antenna switch at reception timing intervals.

16. A receiver as recited in claim 15, wherein said first and said second reference levels are determined by a first and second diode, respectively.

17. A receiver as recited in claim 15, wherein each of said first and said second reference levels are determined by a comparator.

18. A receiver as recited in claim 15, wherein each of said first and said second reference levels are determined by a logical operation circuit.

19. A receiver as recited in claim 15, further comprising a signal level holding circuit that is interposed between said detection circuit and said switch control circuit, said signal level holding circuit delivering said reception intensity signal to said switch control circuit when a next reception is carried out.

20. A receiver as recited in claim 15, wherein said receiver is a radio apparatus for exclusively carrying out reception.

21. A receiver as recited in claim 15, wherein
said first and second comparing devices each comprise the same comparator circuit, and
said logical device comprises a single logical circuit.

* * * * *